United States Patent
Hwang et al.

(10) Patent No.: US 11,650,122 B2
(45) Date of Patent: May 16, 2023

(54) APPARATUS FOR ANALYZING BATTERY CASE

(71) Applicant: LG CHEM, LTD., Seoul (KR)

(72) Inventors: Dongguk Hwang, Daejeon (KR); Jae Wan Park, Daejeon (KR); Sang Hyun Park, Daejeon (KR); Nak Hee Choi, Daejeon (KR); Ji Won Park, Daejeon (KR)

(73) Assignee: LG CHEM, LTD., Seoul (KR)

( * ) Notice: Subject to any disclaimer, the term of this patent is extended or adjusted under 35 U.S.C. 154(b) by 233 days.

(21) Appl. No.: 16/986,672

(22) Filed: Aug. 6, 2020

(65) Prior Publication Data

US 2021/0172827 A1    Jun. 10, 2021

(30) Foreign Application Priority Data

Dec. 6, 2019 (KR) .......................... 10-2019-0161409

(51) Int. Cl.
*G01M 3/32* (2006.01)
*H01M 10/48* (2006.01)

(52) U.S. Cl.
CPC ......... *G01M 3/3272* (2013.01); *H01M 10/48* (2013.01)

(58) Field of Classification Search
CPC .................. F28D 20/02; F28D 20/028; F28D 2020/0082; Y02E 60/14; F28F 2265/14; F28F 2265/12
USPC .............................. 324/95, 400–434; 429/90
See application file for complete search history.

(56) References Cited

U.S. PATENT DOCUMENTS

| | | | |
|---|---|---|---|
| 2006/0134518 A1* | 6/2006 | Kogetsu | H01M 4/1391 427/58 |
| 2006/0263685 A1* | 11/2006 | Kwon | H01M 50/169 429/185 |
| 2009/0044602 A1 | 2/2009 | Zhao | |
| 2010/0112420 A1* | 5/2010 | Back | H01M 50/627 429/90 |
| 2020/0251705 A1 | 8/2020 | Yun et al. | |

FOREIGN PATENT DOCUMENTS

| | | |
|---|---|---|
| EP | 3483978 A2 | 5/2019 |
| JP | 2007-141747 A | 6/2007 |
| JP | 2016-211668 A | 12/2016 |
| KR | 10-0509516 B1 | 8/2005 |
| KR | 1020100049309 A | 5/2010 |
| KR | 10-0997713 B1 | 12/2010 |
| KR | 10-1245284 B1 | 3/2013 |
| KR | 10-1290559 B1 | 7/2013 |
| KR | 10-1756153 B1 | 7/2017 |
| KR | 10-1803257 B1 | 12/2017 |
| KR | 1020190046665 A | 5/2019 |

\* cited by examiner

*Primary Examiner* — Lee E Rodak
*Assistant Examiner* — Trung Q Nguyen
(74) *Attorney, Agent, or Firm* — Dentons US LLP

(57) ABSTRACT

The present disclosure relates to an apparatus and a method for analyzing a battery case, specifically, to the apparatus for analyzing the durability of various types of battery case, such as a pouch type or can type.

The apparatus comprises a first plate which is in close contact with an outer surface of a first sheet, the first sheet forming one side of the battery case; a gas injection tube which is inserted into the battery case while penetrating through the first plate and extends along an inner surface of the first sheet; and a pressure gauge which is connected to the gas injection tube.

11 Claims, 4 Drawing Sheets

[Fig. 1]
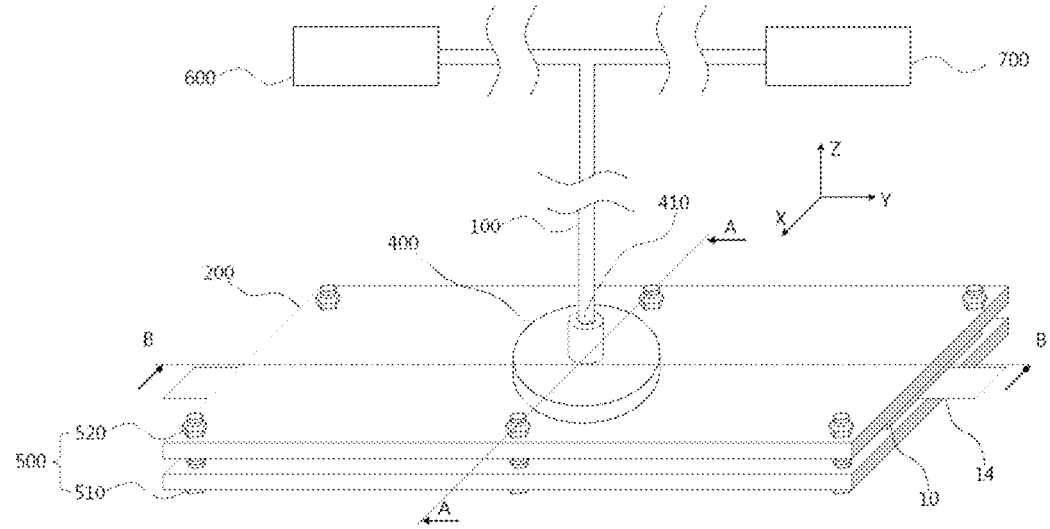
[Fig. 2]
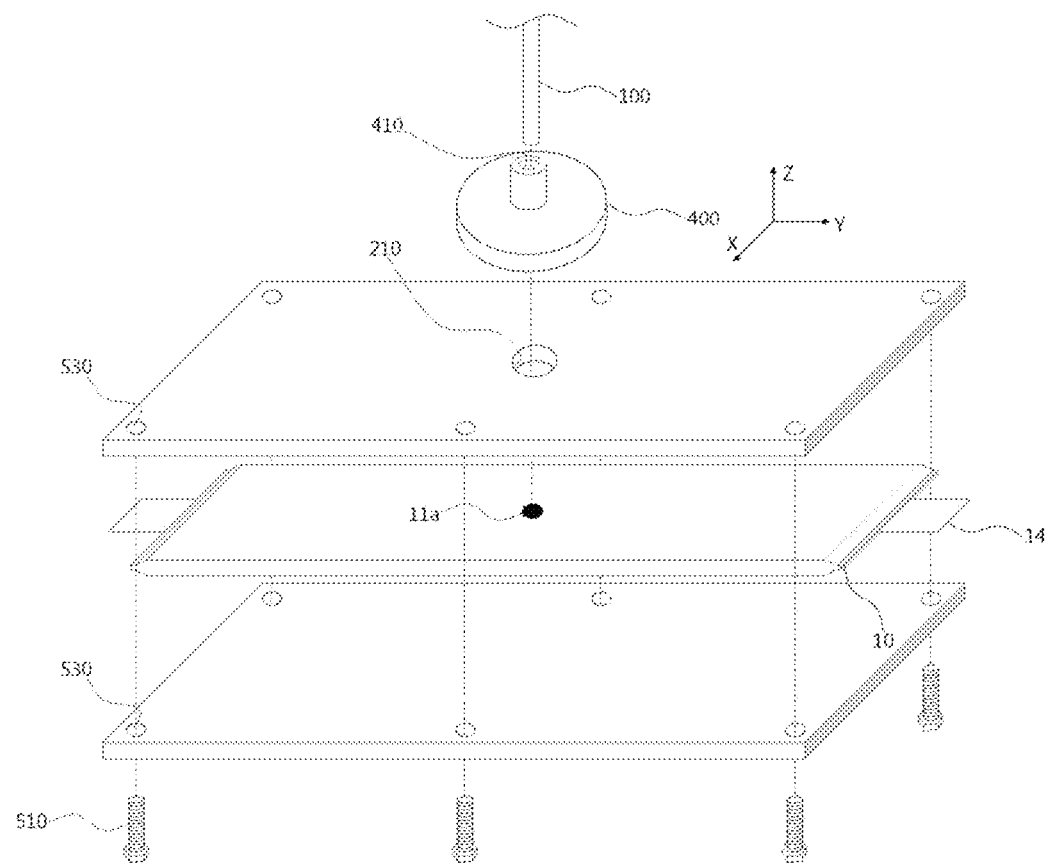

[Fig. 3]
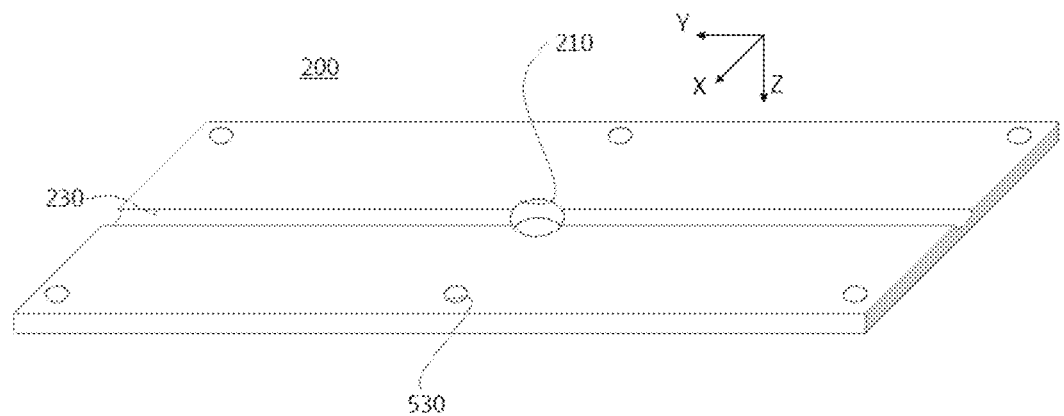
[Fig. 4]
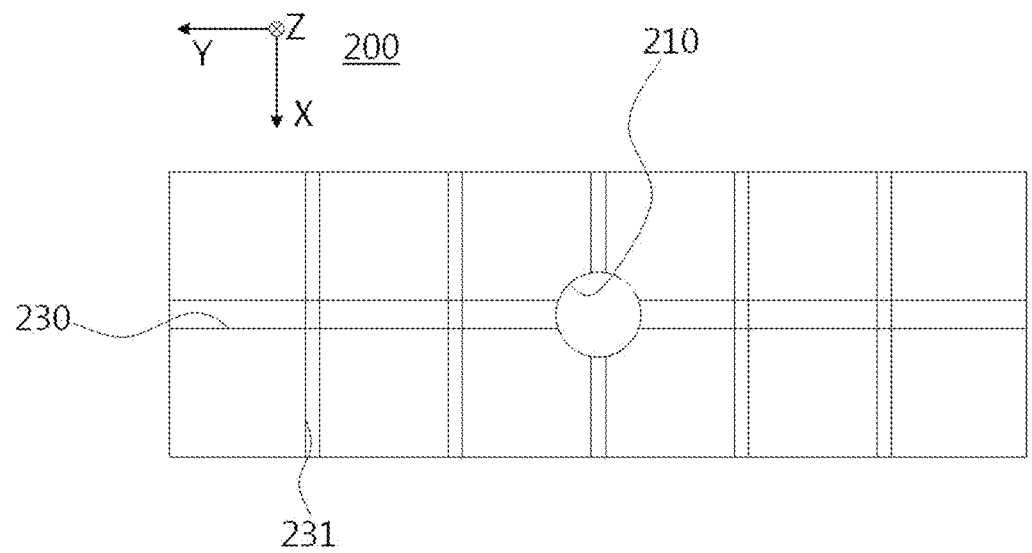

[Fig. 5]
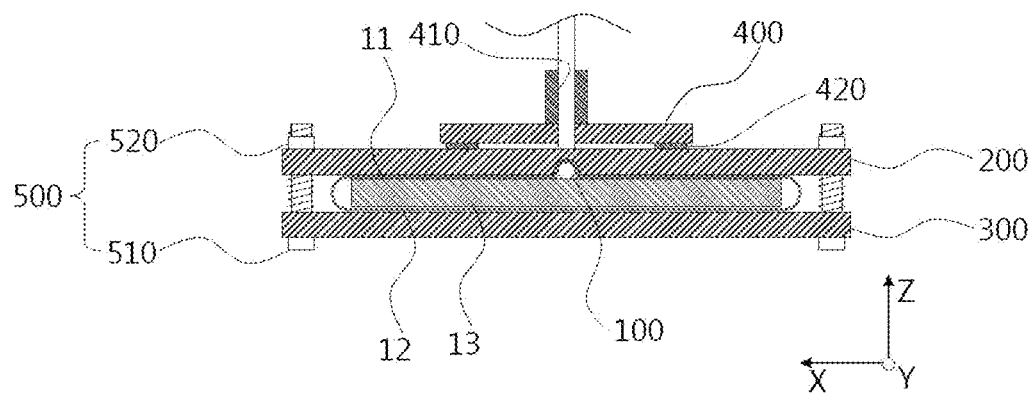
[Fig. 6]
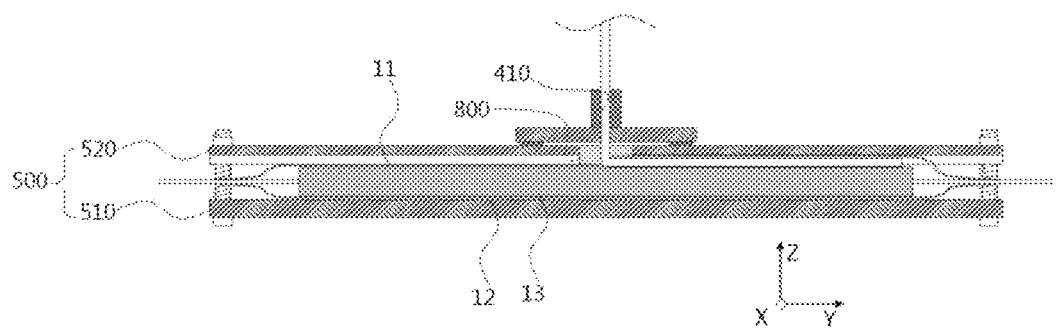
[Fig. 7]
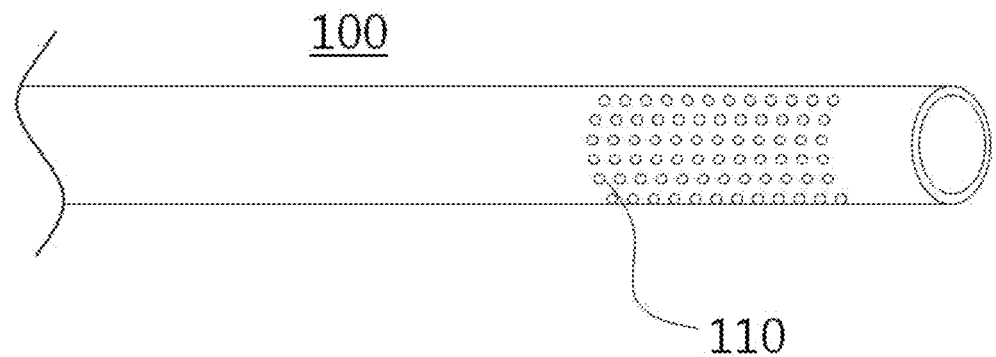

[Fig. 8]
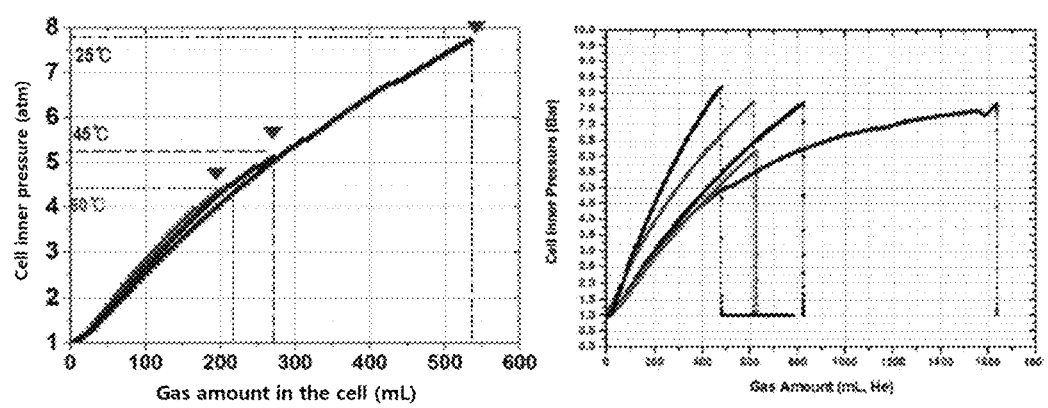

APPARATUS FOR ANALYZING BATTERY CASE

CROSS-REFERENCE TO RELATED APPLICATIONS

This application claims the benefit of and priority to Korean Application No. 10-2019-0161409, filed on Dec. 6, 2019, the disclosures of which are hereby incorporated by reference in their entirety for all purposes as if fully set forth herein.

BACKGROUND

The present invention relates to an apparatus for analyzing a battery case, specifically, the apparatus for analyzing the durability of various types of battery cases, such as a pouch type or a can type battery case.

Secondary batteries are produced in such a way as to contain battery materials (cathode, anode, electrolyte, separator, etc.) in a packaging container using various types of cases such as a pouch type or a can type case. This can prevent reactions of external moisture and oxygen to suppress side reactions in the battery.

However, in a battery, an organic compound such as an electrolyte is decomposed by electrochemistry, thermodynamic reaction, and the like to generate gas. When an excessive amount of gas is generated, the internal pressure of the battery case increases due to the amount of gas generated more than the allowable capacity inside the battery case and the battery case may have swelling or venting at a sealing portion.

Since these phenomena have a great influence on maintaining the performance of a battery, it is necessary to analyze the change in the internal pressure of the battery case according to the difference in the amount of gas inside the battery case and the allowable gas amount and the limit pressure in the battery case. Such analysis data can be used for important judgment and evaluation in battery case design.

In the measurement of the limit pressure of the battery case, it may take a considerable amount of time to measure the limit pressure and the like using the gas generated from inside the battery case. Therefore, it is possible to measure the limit pressure of the battery case and the like by injecting gas from outside the battery case.

Although there are several methods for injecting gas into the inside of the battery case from the outside of the battery case, it is difficult to analyze gas volume and pressure change in real time by simulating the actual condition of the battery and injecting gas into the battery case without leakage (below 0 ppm).

Accordingly, there is a need for a technique capable of real-time measurement for the pressure change according to the change in the amount of gas inside the battery case and analysis of the limit gas amount and pressure at a sealing portion of the battery case.

SUMMARY

The present invention relates to an apparatus for analyzing a battery case, specifically, the apparatus for analyzing the durability of various types of battery cases, such as a pouch type or can type battery case.

The technical problems to be solved by the present invention are not limited to the technical problems mentioned above, and other technical problems that are not mentioned above will be clearly understood by those skilled in the art from the following description.

The apparatus for analyzing a battery case according to the present invention may comprise a first plate which is adhered to an outer surface of a first sheet, the first sheet forming one side of the battery case; a gas injection tube which is inserted into the battery case while penetrating through the first plate and extends along an inner surface of the first sheet; and a pressure gauge which is connected to the gas injection tube to measure a pressure of the gas injection tube, wherein the first plate may be provided with a penetrating hole through which the gas injection tube penetrates, and the penetrating hole may be filled with a curing agent while being penetrated by the gas injection tube.

In the apparatus for analyzing a battery case according to the present invention, the surface of the first plate facing the battery case may be provided with an insertion groove into which the gas injection tube is inserted.

In the apparatus for analyzing a battery case according to the present invention, the insertion groove may be formed to extend from the penetrating hole to the end portions of the first plate.

In the apparatus for analyzing a battery case according to the present invention, the insertion grooves may be provided in plural, and each insertion groove may extend in different directions.

In the apparatus for analyzing a battery case according to the present invention, the width of the insertion groove may be larger than the outer diameter of the gas injection tube.

The apparatus for analyzing a battery case according to the present invention may further comprise a cover plate for covering the penetrating hole on the surface opposite to the surface of the first plate facing the battery case, wherein the gas injection tube may be inserted into the battery case while penetrating through the injection hole provided in the cover plate and the outer peripheral surface of the gas injection tube and the inner peripheral surface of the injection hole may be adhered to be sealed.

In the apparatus for analyzing a battery case according to the present invention, an adhesion member may be inserted between the first plate and the cover plate, wherein the adhesion member may be provided in the form of a closed loop, and the inlet of the penetrating hole may be located inside the closed loop.

The apparatus for analyzing a battery case according to the present invention may further comprise a second plate which is adhered to a second sheet, the second sheet forming the other side of the battery case; and a fixing unit for fixing the first plate and the second plate to each other while the battery case being pressed with the first plate and the second plate.

In the apparatus for analyzing a battery case according to the present invention, materials of the first plate and the second plate may comprise at least one of SUS, bakelite and Si.

In the apparatus for analyzing a battery case of the present invention, the pressure gauge may be connected to the position according to the gas injection tube not inserted into the battery case.

In the apparatus for analyzing a battery case according to the present invention, a plurality of exhaust holes may be provided on the lateral surface of the portion of the gas injection tube inserted into the battery case.

EFFECT OF THE INVENTION

The apparatus for analyzing a battery case according to the present invention can analyze the pressure change according to the changes in the amount of gas inside the battery case in real time while injecting a certain amount of gas into the battery case. Also, when the sealing portion of the battery case reaches a certain pressure limit, it may be possible to measure the pressure when phenomenon such as venting due to damage to the sealing portion occurs.

The apparatus for analyzing a battery case according to the present invention can completely block gas leakage which occurs during gas injection by double sealing using a cover plate and a curing agent.

BRIEF DESCRIPTION OF THE DRAWINGS

FIG. 1 is a perspective view showing the apparatus for analyzing a battery case according to the present invention.

FIG. 2 is a perspective view showing an exploded state of the apparatus for analyzing a battery case according to the present invention.

FIG. 3 is a perspective view showing a first plate according to one embodiment of the present invention.

FIG. 4 is a plan view showing a bottom surface of the first plate according to another embodiment of the present invention.

FIG. 5 is a cross-sectional view showing the A-A cross-section in FIG. 1.

FIG. 6 is a cross-sectional view showing the B-B cross section of FIG. 1.

FIG. 7 is a perspective view showing one end of a gas injection tube.

FIG. 8 is a graph showing analysis results of a battery case using the apparatus for analyzing a battery case according to the present invention.

DETAILED DESCRIPTION OF THE INVENTION

Hereinafter, embodiments according to the present invention will be described in detail with reference to the accompanying drawings. In this process, the size or shape of components shown in the drawings may be exaggerated for clarity and convenience of description. In addition, terms specifically defined in consideration of the configuration and operation of the present invention may vary depending on the intention or practice of the user or operator. Definitions of these terms should be made based on the contents throughout this specification.

In the description of the present invention, it should be noted that the orientation or positional relationship indicated by the terms, "center", "top", "bottom", "left", "right", "vertical", "horizontal", "inside", "outside", "one side" and "other side", etc. is based on the orientation or positional relationship shown in the drawings, or the orientation or positional relationship that is usually arranged when using the product of the present invention, and it is for the description and brief description of the present invention only and it is not to be understood as limiting the present invention as it does not suggest or imply that the indicated device or element must have a specified orientation and be constructed or manipulated with the specified orientation.

FIG. 1 is a perspective view showing the apparatus for analyzing a battery case according to the present invention. FIG. 2 is a perspective view showing an exploded state of the apparatus for analyzing a battery case according to the present invention. FIG. 3 is a perspective view showing a first plate 200 according to one embodiment of the present invention. FIG. 4 is a plan view showing a bottom surface of the first plate 200 according to another embodiment of the present invention. FIG. 5 is a cross-sectional view showing the A-A cross-section in FIG. 1. FIG. 6 is a cross-sectional view showing the B-B cross section of FIG. 1. FIG. 7 is a perspective view showing one end of a gas injection tube 100. FIG. 8 is a graph showing analysis results of a battery case 10 with the apparatus for analyzing a battery case according to the present invention.

Hereinafter, the structure and function of the apparatus for analyzing a battery case according to the present invention will be described in detail with reference to FIGS. 1 to 8.

As shown in FIGS. 1, 2, and 5, the apparatus for analyzing a battery case according to the present invention may comprise a first plate 200 which is adhered to an outer surface of a first sheet 11, the first sheet forming one side of the battery case 10, a gas injection tube 100 which is inserted into the battery case 10 while penetrating through the first plate 200 and extends along an inner surface of the first sheet 11, and a pressure gauge 700 which is connected to the gas injection tube 100 to measure a pressure of the gas injection tube 100.

The battery case 10 to be analyzed in the present invention may be a pouch type case made of flexible material. The battery case 10 determines the appearance of a battery and can accommodate an electrode assembly 13 and an electrolyte solution therein. The electrode assembly 13 may comprise a cathode, an anode, or a separator. For example, in the case of the pouch type battery case 10, the end portion of the first sheet 11 and the end portion of the second sheet 12 may be fused to each other to be sealed while arranging the first sheet 11 and the second sheet 12 to face each other. The battery may be provided with a lead tap 14 for electrically connecting the electrode assembly 13 inside the battery case 10 to an electrical device outside the battery case 10. The lead tab 14 may have one end connected to the electrode assembly 13 inside the battery case 10 and the other end protruding out of the battery case 10. That is, the lead tab 14 may be provided in the battery in a shape penetrating the battery case 10. The battery case 10 may be sealed so that the material inside the battery case 10 does not leak out to a bonding portion between the first sheet 11 and the second sheet 12 and a portion through which the lead tab 14 penetrates. The apparatus for analyzing a battery case according to the present invention can analyze the strength of the sealing portion of the battery case 10 as described above in real time.

The first plate 200 may be provided with a penetrating hole 210 through which the gas injection tube 100 penetrates, and the penetrating hole 210 may be filled with a curing agent 800 while being penetrated by the gas injection tube 100. The battery case 10 may be provided with an insertion hole 11a into which one end of the gas injection tube 100 can be inserted into the battery case 10. The insertion hole 11a may be provided at a position facing the penetrating hole 210, and the diameter of the insertion hole 11a may be formed smaller than the diameter of the penetrating hole 210.

The material of the curing agent 800 may be preferred which can combine with a material such as metal and has no destruction of crystallinity in a high temperature and high pressure environment. The curing agent 800 which comprises at least one of an epoxy resin and a phenol resin, can be adhered to a battery case made of a material comprising at least one of PP, PE, PET, Al, and vinyl to seal it. That is, in the apparatus for analyzing a battery case according to the present invention, the penetrating hole may be filled with the curing agent 800 so that the outer surface of the battery case 10 around the insertion hole 11a is adhered to the inner surface of the penetrating hole 210 while the gas injection tube 100 being inserted into the insertion hole 11a, thereby achieving first sealing.

The gas injection tube 100 is a tube comprising one or more components among Teflon, SUS, PP and PE, through which a gas for controlling the pressure inside the battery case 10 can be injected into the battery case 10. A gas injection tube 100 may be connected to a mass flow controller 600 and a pressure gauge 700.

The mass flow controller 600 may control the amount of gas injected into the battery case 10. The gas injected into the battery case 10 may be selected from He, $CO_2$, Ar, $N_2$, etc. according to the analysis purpose and conditions. By controlling the amount of injection gas through the mass flow controller 600, the internal pressure of the battery case 10 can be controlled, and the state of the battery case 10 according to the internal pressure may be analyzed. Since the mass flow controller 600 and the pressure gauge 700 are connected concurrently, it is possible to measure the pressure change with respect to the amount of injection gas in real time.

The pressure gauge 700 is for detecting the internal pressure of the battery case 10 and may be connected to a portion of the gas injection tube 100 located outside the battery case 10. If the pressure gauge 700 is connected to the inside of the battery case 10, the battery case 10 should be provided with a separate hole for the pressure gauge 700 and a sealing structure for this. For this reason, the pressure gauge 700 may be preferably connected to a portion of the gas injection tube 100 located outside the battery case 10. Therefore, if the resistance of line of the gas injection tube 100 increases, a delay and an error may occur in measuring the internal pressure of the battery case 10 by the pressure gauge 700 in real time. In consideration of this, it may be necessary to prevent wrinkles or clogging when the gas injection tube 100 is connected to the battery case 10.

As illustrated in FIG. 3, an insertion groove 230 into which the gas injection tube 100 is inserted may be formed on a surface of the first plate 200 facing the battery case 10. The gas injection tube 100 can be easily inserted into the battery case 10 owing to the space formed by the insertion groove 230. The insertion groove 230 may be formed extending from the penetrating hole 210 to end portions of the first plate 200. Since the insertion groove 230 is formed from the center, in which the penetrating hole 210 exists, to the end portion of the first plate 200, one end of the gas injection tube 100 is inserted from the inside of the battery case 10 to the vicinity of the end portion of battery, in which the electrode assembly 13 does not exist, to reach an area free of obstacles to gas injection.

As shown in FIG. 4, a gas diffusion groove 231 connected to the insertion groove 230 may be provided on the surface of the first plate 200 facing the battery case 10. When the battery case 10 is pressed with the first plate 200, the inner surface of the battery case 10 may be adhered to the electrode assembly 13. In this case, the gas injected into the battery case 10 may be diffused inside the battery case 10 slowly. The gas diffusion groove 231 is intended to prevent this problem and may be to provide a space in which the inner surface of the battery case 10 and the electrode assembly 13 are spaced apart from each other. Therefore, the gas injection tube 100 may be advantageous for gas diffusion to be inserted up to the position where the insertion groove 230 and the gas diffusion groove 231 are coupled to each other.

The insertion grooves 230 are provided in plural, and each insertion groove 230 may extend in different directions. When the gas diffusion is impeded due to the shape of the electrode assembly 13 in the battery case 10, the gas injection tube 100 is branched into several branches to be inserted along a plurality of insertion grooves 230, so that gas can be injected at different points.

As shown in FIGS. 5 and 6, since the gas injection tube 100 is inserted into the insertion groove 230 located from the inside the battery case 10 to the outside the battery case 10, it may be inserted into the insertion groove 230 together with a part of the battery case 10. Therefore, the width of the insertion groove 230 may be larger by 1 mm to 100 mm than the outer diameter of the gas injection tube 100 in consideration of the stiffness and thickness of the battery case 10. If the width of the insertion groove 230 is too small, it is difficult to insert the gas injection tube 100 into the battery case 10, and the gas injection tube 100 may be pressed, so that gas injection may not be smoothly performed. Conversely, if the width of the insertion groove 230 is too large, the gap between the battery case 10 and the first plate 200 may become large, which may affect the analysis result. Therefore, the width of the insertion groove 230 may be determined in consideration of the outer diameter of the gas injection tube 100, the thickness of the battery case 10, and the like.

As shown in FIGS. 5 and 6, the apparatus for analyzing a battery case according to the present invention may further comprise a cover plate 400 for covering the penetrating hole 210 on the surface of the first plate 200 opposite to the surface of the first plate 200 facing the battery case 10.

The gas injection tube 100 penetrates the injection hole 410 provided in the cover plate 400 and is inserted into the battery case 10. The outer peripheral surface of the gas injection tube 100 may be adhered to the inner peripheral surface of the injection hole 410 to be sealed. For example, the gas injection tube 100 may be coupled to the cover plate 400 by a lok fitting. The cover plate 400 may be coupled to the first plate 200 through bolts. The injection hole 410 may be provided at a position facing the penetrating hole 210 in the cover plate 400. As gas is injected into the battery case 10, gas may leak from a portion where the curing agent 800 is in contact with the gas injection tube 100. In the apparatus for analyzing a battery case according to the present invention, the curing agent 800 provides a different pressure value that can withstand during curing depending on the material and thus gas leakage may occur on the surface of the gas injection tube 100 and the battery case 10. Accordingly, the gas leakage can be completely blocked by double sealing through the cover plate 400.

An adhesion member may be inserted between the first plate 200 and the cover plate. The adhesion member is provided in the form of a closed loop, and the inlet of the penetrating hole 210 may be located inside the closed loop. For example, the sealing member 420 may be an O-ring, a gasket, or the like.

The apparatus for analyzing a battery case according to the present invention may further comprise a second plate 300 which is adhered to a second sheet 12, the second sheet 12 forming the other side of the battery case 10, and a fixing unit 500 for fixing the first plate 200 and the second plate 300 to each other while the battery case 10 being pressed with the first plate 200 and the second plate 300. The fixing unit 500 may include a fixing bolt 510 and a fixing nut 520. The fixing bolt 510 may penetrate fixing holes 530 provided in the first plate 200 and the second plate 300 to fix the first plate 200 and the second plate 300 to each other.

The fixing bolt 510 is inserted from the lower surface of the second plate 300, and the upper end thereof protrudes from the upper surface of the first plate 200 so that the fixing bolt may be coupled with the fixing nut 520. Since the fixing bolt 510 need to fasten to the fixing nut 520 while adjusting the pressure applied to the battery case 10 by the first plate 200 and the second plate 300, the fixing bolt 510 may be preferably inserted from the bottom to the top to facilitate fastening.

Materials of the first plate 200 and the second plate 300 may be which can maintain the shape of the battery case 10 in the analysis process, and may be selected from SUS, Bakelite, Si pad, or the like. Since the first plate 200 and the second plate 300 should not be deformed by the pressure emitted from the battery case 10 and the experimental environment, they may be desirable to be made of materials having heat resistance, chemical resistance, and high rigidity.

As illustrated in FIG. 7, a plurality of exhaust holes may be provided on the lateral surface of the portion of the gas injection tube 100 inserted into the battery case 10. Even if the gas injection tube 100 is pressed or clogged, the gas is injected into the battery case 10 by the exhaust holes, so that it is possible to prevent increase in resistance of line of the gas injection tube 100 due to an abnormal situation.

FIG. 8 is a graph showing analysis results of a battery case 10 with the apparatus for analyzing a battery case according to the present invention. As illustrated in FIG. 8, since it is possible to convert the time for the gas to be injected through the mass flow controller 600 for a predetermined time to a gas amount, it is possible to calculate the amount of gas injected into the battery case 10. In addition, it is possible to measure the pressure change over time in real time. Furthermore, since a small amount of gas injection is possible, the drop phenomenon of the sudden pressure gauge 700 as shown in the graph on the right in FIG. 8 can be detected even if a minute leak occurs due to reaching a limit pressure at which the sealing portion of the battery case 10 is damaged, and from this result, the sealing limit pressure of the battery case 10 can be obtained. Since there is no big restriction in the experiment space, experiments for each temperature can be performed using ovens simultaneously.

Although the embodiments according to the present invention have been described above, these are merely exemplary, and those skilled in the art will understand that various modifications and equivalent ranges of the embodiments are possible therefrom.

What is claimed is:

1. An apparatus for analyzing a battery case, the apparatus comprising:
a first plate which is configured to adhere to an outer surface of a first sheet forming one side of a battery case, the outer surface of the first sheet being the outermost surface of the one side of the battery case;
a gas injection tube which is configured to be inserted into the battery case while penetrating through the first plate and extends along an inner surface of the first sheet, and through which gas is injected into the battery case;
a pressure gauge which is connected to the gas injection tube to measure a pressure of the gas injection tube and which detects internal pressure of the battery case; and
a mass flow controller which is connected to the gas injection tube and controls an amount of gas injected into the battery case,
wherein the first plate is provided with a penetrating hole through which the gas injection tube penetrates, and
wherein the penetrating hole is filled with a curing agent while being penetrated by the gas injection tube.

2. The apparatus according to claim 1, wherein the surface of the first plate facing the battery case is provided with an insertion groove into which the gas injection tube is inserted.

3. The apparatus according to claim 2, wherein the insertion groove is formed to extend from the penetrating hole to the end portions of the first plate.

4. The apparatus according to claim 3, wherein the insertion groove is provided in plural, and each insertion groove extends in different directions.

5. The apparatus according to claim 2, wherein the width of the insertion groove is larger than the outer diameter of the gas injection tube.

6. The apparatus according to claim 1, further comprising a cover plate for covering the penetrating hole on the surface opposite to the surface of the first plate facing the battery case,
wherein the gas injection tube is inserted into the battery case while penetrating through the injection hole provided in the cover plate and
the outer peripheral surface of the gas injection tube is adhered to the inner peripheral surface of the injection hole to be sealed.

7. The apparatus according to claim 6, wherein an adhesion member is inserted between the first plate and the cover plate,
the adhesion member is provided in the form of a closed loop, and
the inlet of the penetrating hole is located inside the closed loop.

8. The apparatus according to claim 1, further comprising:
a second plate which is in close contact with a second sheet, the second sheet forming the other side of the battery case; and
a fixing unit for fixing the first plate and the second plate to each other while the battery case being pressed with the first plate and the second plate.

9. The apparatus according to claim 8, wherein materials of the first plate and the second plate comprises at least one of SUS, bakelite and Si.

10. The apparatus according to claim 1, wherein the pressure gauge is connected to the position of the gas injection tube not inserted into the battery case.

11. The apparatus according to claim 1, wherein a plurality of exhaust holes are provided on the lateral surface of the portion of the gas injection tube inserted into the battery case.

* * * * *